(12) United States Patent
Mossakowski

(10) Patent No.: US 7,359,560 B2
(45) Date of Patent: Apr. 15, 2008

(54) METHOD FOR COMPRESSION AND DECOMPRESSION OF IMAGE DATA WITH USE OF PRIORITY VALUES

(75) Inventor: Gerd Mossakowski, Ahlen (DE)

(73) Assignee: T-Mobile Deutschland GmbH, Bonn (DE)

( * ) Notice: Subject to any disclaimer, the term of this patent is extended or adjusted under 35 U.S.C. 154(b) by 739 days.

(21) Appl. No.: 10/472,288

(22) PCT Filed: Mar. 19, 2002

(86) PCT No.: PCT/DE02/00995

§ 371 (c)(1),
(2), (4) Date: Dec. 3, 2003

(87) PCT Pub. No.: WO02/078322

PCT Pub. Date: Oct. 3, 2002

(65) Prior Publication Data

US 2004/0109609 A1     Jun. 10, 2004

(30) Foreign Application Priority Data

Mar. 21, 2001  (DE) ............... 101 13 881
Oct. 25, 2001  (DE) ............... 101 52 612

(51) Int. Cl.
*G06K 9/36*    (2006.01)

(52) U.S. Cl. .............. 382/240; 382/232; 382/233; 382/238; 375/240

(58) Field of Classification Search ........... 382/240, 382/233, 247, 242, 239, 232, 244, 190, 194; 375/240.01, 240.08, 240.21, 240.23, 240.24, 375/240.26

See application file for complete search history.

(56) References Cited

U.S. PATENT DOCUMENTS 5,647,024 A    7/1997    Kawauchi et al.

(Continued)

FOREIGN PATENT DOCUMENTS

EP    05 244435 A    9/1993

OTHER PUBLICATIONS

Simon, S, "Generalized Run-Length Coding for SNR-Scalable Image Compression", Signal Precessing VII, Theories and Applications, Proceedings of Eusipco-94. Seventh European Signal Processing Conference, Proceedings of Eusipco-94—7th European Signal Processing Conference, Edinburgh, UK Sep. 13-16, 1994, pp. 560-563, vol. 1.

(Continued)

*Primary Examiner*—Samir Ahmed
*Assistant Examiner*—Eric Rush
(74) *Attorney, Agent, or Firm*—Procopio, Cory, Hargreaves & Savitch LLP

(57) ABSTRACT

The invention relates to a method for compression and decompression of pixel-based image data. Each pixel first has the pixel value determined. A pixel difference value is then determined for each pixel, from a given number of neighboring pixels, which results from the difference in the pixel value for the pixel in question to each of the neighboring pixels thereof. The pixel difference values are then sorted in descending order. Each pixel used for the calculation of a pixel difference value is assigned to a pixel group. The pixel groups obtained thus are stored according to the descending sorting of the pixel difference values. For regeneration of the image the pixel groups with the highest pixel difference values are first loaded. A triangle is formed from the three closest pixel groups. The surfaces of each triangle are filled in a coloring process, calculated from the color values of the pixel groups forming each of the three corners of the triangle. The more pixel groups are loaded the smaller the triangles become and the more precise the reconstruction of the image.

11 Claims, 3 Drawing Sheets

U.S. PATENT DOCUMENTS

| | | | |
|---|---|---|---|
| 5,675,669 | A | 10/1997 | Kim |
| 6,496,607 | B1 * | 12/2002 | Krishnamurthy et al. ... 382/282 |
| 6,731,792 | B1 * | 5/2004 | Tanaka ................ 382/164 |
| 6,897,977 | B1 * | 5/2005 | Bright ................. 358/1.18 |
| 6,901,169 | B2 * | 5/2005 | Bottou et al. ........... 382/224 |

OTHER PUBLICATIONS

Carlsson S, "Sketch Based Coding of Grey Level Images", Signal Processing; European Journal Devoted to the Methods and Applications of Signal Processing, Elsevier Science Publishers B.V. Amsterdam, NL, vol. 15, No. 1, Jul. 1, 1988, pp. 57-83.

Yan J K et al, "Encoding of Images Based on a Two-Component Source Model", IEEE Transactions on Communications, IEEE Inc., New York, US, vol. 25, No. 11, Nov. 1, 1977, pp. 1315-1322.

Kunt M et al, "Second-Generation Image-Coding Techniques", Proceedings of the IEEE, IEEE. New York, US, vol. 73, No. 4, Apr. 1, 1985, pp. 549-574.

Chee Y-K, "Survey of Progressive Image Transmission Methods", International Journal of Imaging Systems and Technology, Wiley and Sons, New York, US, vol. 10, No. 1, 1999, pp. 3-19.

Bell D M et al, "Progressive Technique for Human Face Achieving and Retrieval", Journal of Electronic Imaging, Spie+IS&T, US, vol. 5, No. 2, Apr. 1, 1996, pp. 191-197.

Marshall S, "Application of Image Contours to Three Aspects of Image Processing: Compression, Shape Recognition and Stereopsis" IEE Proceedings I. Solid-State & Electron Devices, Institution of Electrical Engineers, Stevenage, GB, vol. 139, No. 1 Part 1, Feb. 1, 1992, pp. 1-8.

* cited by examiner

METHOD FOR COMPRESSION AND DECOMPRESSION OF IMAGE DATA WITH USE OF PRIORITY VALUES

BACKGROUND OF THE INVENTION

The invention relates to a method for the compression and decompression of image data.

Today there are a plurality of technologies and compression methods for storing image data. The technologies used derive essentially from pixel-based and vector-based methods.

In the case of the pixel-based technologies a raster is laid over the image. Each raster point corresponds to one pixel. A pixel value is encoded with one bit (for example, WBMP→black and white) or several bits (for example, BMP→true color). In order to reduce the size of the image files various compression methods can be applied. An effective method consists of reducing the bits per pixel. Furthermore, methods can be applied in which pixels are combined into groups. These are, as a rule, square areas which are then transformed with the aid of the DCT (discrete cosine transformation) into the frequency domain. The high frequency content arising in the transformation can be ignored without noticeable loss of quality. This method is, for example, applied in JPEG images. In the case of very high JPEG compressions it can lead to distorting, disordered patches of rectangles in the image, so-called artifacts.

In the case of vector-based methods the image is described unambiguously with the aid of geometric forms (for example, rectangles, or circles). A known method is the so-called SVG (scaleable vector graphics). This method can be used with outstanding results in technical drawings since images prepared in this manner can be scaled very well. The corresponding files are clearly smaller than in traditional binary bitmap formats. However, these methods are less suited to storing photographs.

Along with the traditional photographic apparatuses which expose a film, more and more there are photographic apparatuses which store the photograph digitally on a storage medium instead of on film. Since these storage media only have a limited capacity, only a small number of high-resolution photographs, or many images with low resolution, can be stored. A flexible scaling is not possible at the present time.

SUMMARY OF THE INVENTION

The objective of the invention is to provide a method for the compression and decompression of image data, said method permitting a simple and flexible adaptation to storage size, different image resolutions, and display sizes.

This objective is realized by the features of claim 1.

Advantageous developments and extensions of the invention are specified in the subordinate claims.

The invention is based on a combination of the pixel-based and vector-based technology. As the first step the image is covered with a raster. For each pixel of the raster the pixel value, i.e., the color value or luminance value, is first determined. Subsequently an additional value, in the following called the pixel difference value, is calculated for each pixel from a previously determined number of neighboring pixels. The pixel difference value follows from the difference of the pixel value of a pixel under consideration and that of each of its neighboring pixels under consideration. The greater the difference of the pixel value relative to that of its neighboring pixels is, the greater this pixel difference value is. Subsequently the pixel difference values of the individual pixels of the image are sorted in decreasing order. Each of the pixels used for the calculation of a pixel difference value is incorporated into a pixel group. The pixel groups thus obtained are stored in the decreasing order of the pixel difference values, that is, according to the priority determined by the pixel difference value. A priority list results, where those pixel groups appear first on the list whose pixel difference value, and thus priority, is greatest.

The pixel values of the pixel groups can be further compressed by run length encoding or other known compression methods, for example, zip methods.

For the reproduction of the image, the pixel groups with the highest pixel difference value (priorities) are first loaded. From the three closest pixel groups a triangle is formed. Triangles are scaleable in their size and can thus be adapted to different resolutions. If certain areas of the images are to be reproduced particularly precisely, the pixel groups for these areas can be provided with a higher priority. The surface of the respective triangle is filled by a color gradient which is calculated from the color values of each of three pixel groups forming the corners of the triangle. In black-and-white images the respective luminance value of the pixels or pixel groups is considered instead of the color values and a corresponding luminance gradient is calculated.

The more pixels are represented, the smaller the triangles are, and thus the more precisely the image can be reconstructed.

The advantages of the method according to the invention lie in high scaleability due to simple adaptation to different display sizes and the possibility of increased resolution of interesting areas of an image by prioritizing certain areas of an image.

The method makes it possible for the manufacturer or image-processing professionals to use manufacturer-specific optimization routines by the different prioritizations. However, since the source pixel values are always transmitted, the image can also be generated without the use of the manufacturer-specific optimization routines.

Furthermore, an increase of resolution of details is possible by reloading the interesting areas of the image instead of reloading a completely new image with another resolution.

The method is very fault-tolerant since the image can also be generated once again in case of transmission errors of individual pixel groups.

An embodiment example of the invention is explained in more detail with the aid of the figures in the drawings. Additional features, advantages, and possibilities of application of the invention follow from the drawings and their description. Shown are:

BRIEF DESCRIPTION OF THE DRAWINGS

FIG. 3: a newly generated image array with inserted pixel groups in the corner of the image, FIG. 4: filling of the surfaces between the pixel groups already filled, FIG. 5: inserting additional pixel groups and filling of the surfaces lying therebetween.

DETAILED DESCRIPTION OF THE DRAWINGS

Figures 1, 2:
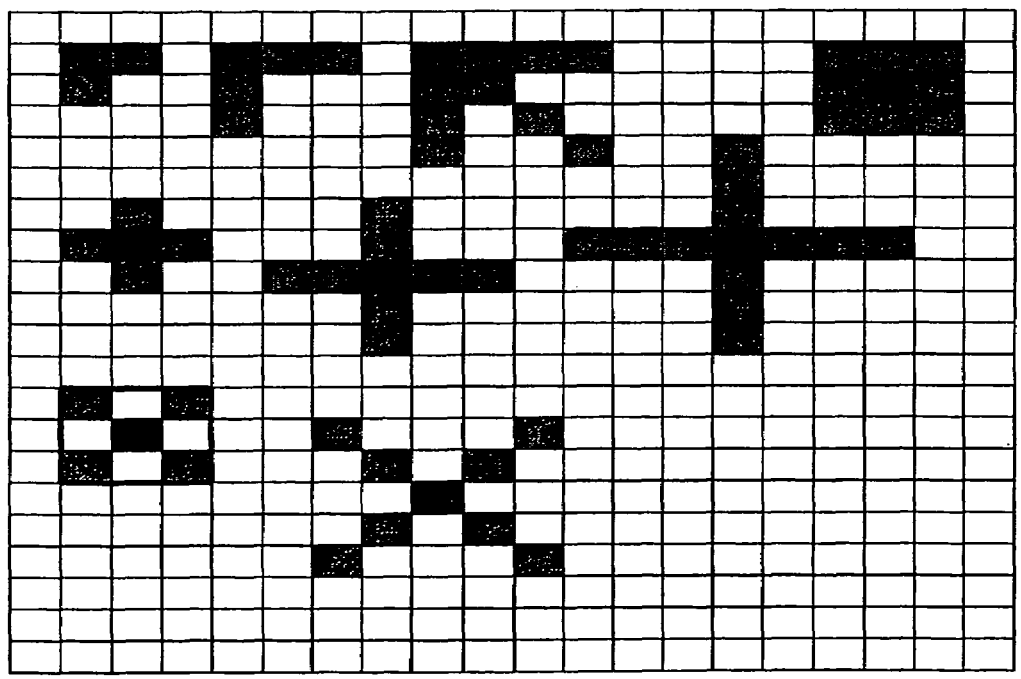
FIG. 1: a representation of an image array of 20×21 pixels
FIG. 2: a representation of various forms of pixel groups.

In the following a compression and decompression of a 2-dimensional image file (image array) is described with the aid of an example.

The following assumptions are made:

The image source is present as a bit map, that is, as an image array.

Each pixel of the image array is represented by a 32-bit value (pixel value). The 32 bits are, for example, subdivided into 4 values (transparent, red, green, blue), each with 8 bits.

The image array represented as an example is an image of the image width of 20 pixels and an image height of 21 pixels. The position of the pixels is determined by an integer. The image array is enumerated from 0 to 419 in the manner shown in FIG. 1. The number within each box corresponds to the position of the corresponding pixel.

The compression of the image is done in the following manner:

Reading in the Image Array

An image is read into the 20×21 pixel image array shown in FIG. 1. Each pixel is defined by its position (0 to 419) and its pixel value (color or luminance value).

Determining Pixel Groups

Next it is determined which neighboring pixels form a pixel group. In so doing, p0 denotes that pixel which specifies the position of the pixel group. The position of the remaining pixels, e.g., p1-p4, of a pixel group relative to the reference pixel p0 follows from the type (form) of pixel group used. In FIG. 2, by way of example, several possible forms of pixel groups are represented. Pixel groups which are symmetric to the reference pixel p0 as well as pixel groups which are asymmetric to the reference pixel p0 can be formed. Which type of pixel group is used is, among other things, dependent on the type of image material and the desired compression rate. As a rule, the more pixels a pixel group includes the larger the compression factor to be achieved is. The same form of pixel group must be used for encoding and decoding, e.g., compressing and decompressing, the image.

In the further description of the method, processing will be with the form of the pixel group in FIG. 2 with a boldface border (lower left).

Determining Priority Values

For each pixel p0 of a pixel group the priority in relation to its pixel group is calculated. In so doing each pixel 0-419 of the image becomes the reference pixel once.

The pixels at the edge of the image can be subjected to a special treatment, for example, by selection of a certain pixel group form in the area of the edge or reduction of the surface under consideration (cutting off of the edge areas).

For the calculation of the priority there can be various methods of computation. By way of example, a linear method is used here. For this, the individual pixel values P0, P1, P2, P3, and P4 of a pixel group are divided into their color content red, green, and blue. Each of these color values is represented by 8 bits. For each color of each pixel P1-P4 a color difference value is determined relative to P0, for example, P0_red-P1_red, P0_red-P2_red, . . . , P0_blue-P4_blue. The absolute color difference values are added and divided by the number of the colors and the number of the pixels under consideration. The result is a priority value for the pixel group under consideration. The more different the color values of the individual pixels of the pixel group are, the greater the priority value.

Additional methods for the determination of the priority value are the utilization of gray tones or the maximal value of a color difference of a color. Since later the priority value itself is not transmitted or stored, the method for the determination of the priority value has no direct influence on the decoding.

Through this prioritization one achieves the result that image areas which have a great alternation of color or contrast, such as, for example, edges, receive a high priority and image contents remaining relatively constant, such as, for example, blue sky, receive a lower priority.

Sorting Priority Values

In this step the priority values are sorted in decreasing order. Depending on the implementation, a sorting can be carried out after determining each new priority value, or at a still later time.

Depending on the available resources, dependence on the position of the prioritized pixel groups can be drawn upon along with the pure prioritization by the color values of neighboring pixels.

An instance of application should illustrate this. If, at sea, one observes a horizon, it appears as a horizontal line. It is to be expected that the priority values of each pixel group along this horizon are approximately equal. In this case the points of the line of the horizon lying furthest from one another have the greatest power to provide information. Merely by transmitting the leftmost and rightmost pixel groups of the horizon it is possible to reconstruct it once more.

An additional possibility of prioritization lies in the higher valuation of certain areas of the image. Such an area of an image can, for example, be faces in photographs. Although faces in vacation photographs often only make up, as a percentage, a small area of the entire image, they are usually the center of attention. Such a human perceptual process can be taken into account by corresponding prioritization of the pixel groups of these areas of the image (face areas). Likewise the pixel groups in the center of the image can be subjected to a correspondingly higher prioritization.

An additional possibility of the optimization consists of the fact that neighboring pixel groups are mutually superimposed. Through clever selection of the pixel groups it is possible to avoid superimposed pixel values of neighboring groups being redundantly transmitted.

If the image to be compressed is taken directly with a CCD camera or a scanner, there is in principle the possibility of obtaining an array sorted according to priorities directly from the image-processing microchip present in the camera/scanner. Thus a significant portion of the computational effort in the compression is spared.

Storing Pixel Groups

First several parameters of the image are stored. Listed by way of example are the:
- image width (in pixels)
- image height (in pixels)
- used form of the pixel group (not necessary if only one form is standardized)
- the 4 pixel groups of the image corners.

Subsequently the individual pixel groups are stored according to their priority, that is, pixel groups with high priority are stored first (and later also read out first).

For this, the position value of the reference pixel p0 of the pixel group is first stored. Subsequently the pixel values P0, P1, P2, P3, P4 are stored.

Example:

Position value P0, pixel values P0, P1, P2, P3, P4; next position value P0 (with the same or lower priority), pixel values P1, P2, P3, P4, . . . , next position value P0 (with the lowest priority), pixel values P0, P1, P2, P3, P4.

The storing can be optimized by various methods which are addressed here only by way of example.

A run length encoding of the pixel groups can be performed. For example, if in an area of the image no red content appears, it can be transmitted with, for example, only 2 bits instead of 8 (red), or the number of leading zeros can be exploited.

Furthermore, customary compression methods, e.g., zip format, can be used.

By determining a limiting value for the prioritization a certain quality can be ensured. For example, a limiting value for the pixel difference values can be determined below which the associated pixel group always receives the lowest priority value.

In a determination of a maximal file size it is ensured through the prioritization that the essential image information is stored first.

Decompressing the Image

Generating a New Image Array

For the generation of a new image the parameters of the image are first read in and evaluated.

The image width, image height, and form of the pixel group are an example. From these values an initially empty image array is then generated comparably to the representation in FIG. 1. If the image height and image width of the original image and the representation now desired do not agree (for example, limited PDA display or high-resolution screen), there must be corresponding scaling. For this, the recalculation factors are first determined (image width_original/image width_display and image height_original/image height_display). These factors can be used in order to convert by calculation the position value of the original image into the position value of the new display.

Inserting Corner Pixel Groups

Figures 3, 4:
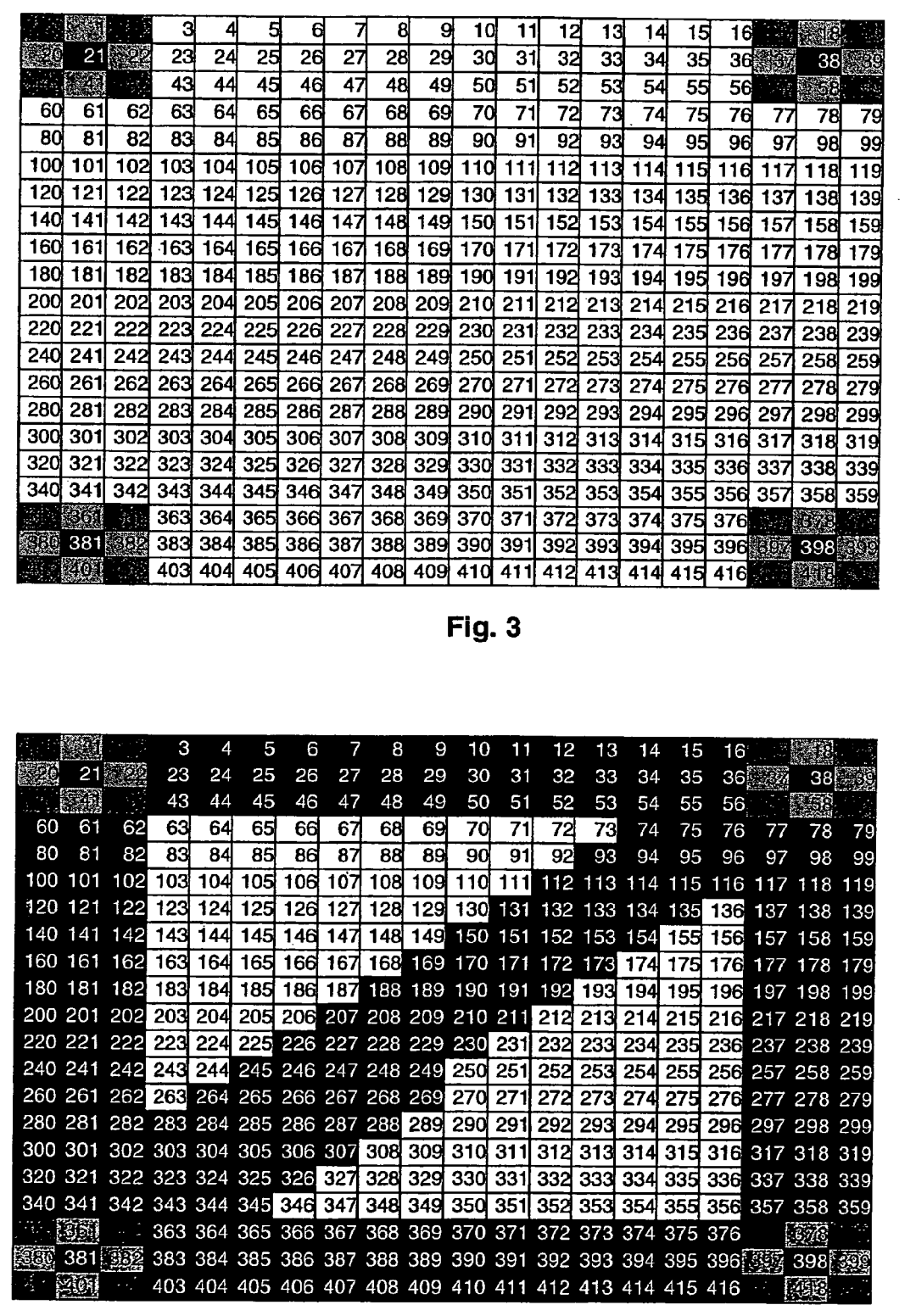

As represented in FIG. 3 the prioritized pixel groups are now read in according to their order. First the 4 pixel groups are entered into the newly generated image array. The position (p0) of the respective pixel group is determined by the fields 21, 38, 381, or 398 shaded in black. This position value (p0) is present as an integer in the stored file. Subsequently the pixel values (p1-p4) belonging to the respective pixel group and shaded in dark gray are entered into the new image array. The pixel values lying therebetween and shaded light gray can then be calculated from the fields shaded dark gray and black. For the calculation the known pixel values are first divided into their components red, green, and blue. Subsequently the average value of each color is calculated, e.g., pixel(22)=(pixel(2)+pixel(21)+pixel(42))/3.

Filling Surfaces

Now the pixel groups present are connected to one another by lines. Triangles result whose corners are defined by the corresponding pixel groups. By way of example, this should be illustrated by the line between pixel position 2 and pixel position 17. The color gradient of the line is calculated with the aid of the color values of the pixels 2 and 17. First, the number of pixels between these two positions is determined, in this example 14. Subsequently the color difference is determined for each color (red, green, blue), for example, a color value of 2 at position 2 and a color value of 30 at position 17 yields a color difference of 28. A color value increase per pixel, from pixel 2 to pixel 17, is then calculated from the color difference/number (in the example, 28/14, which equals 2).

The surfaces still remaining are filled by drawing horizontal lines, for example, from position 63 to position 74, from position 82 to position 93, and so on. Also here a provisional color gradient between the points is calculated as specified above.

Figure 5:
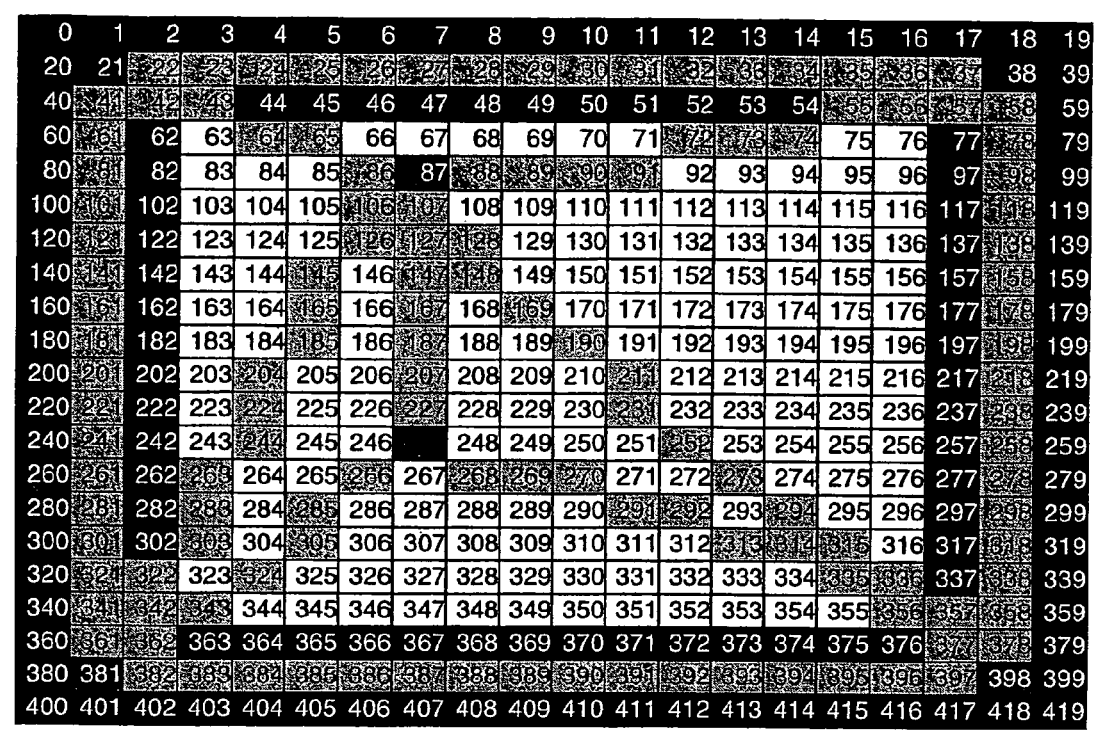

As FIG. 5 shows, each additional pixel group added yields additional triangles which can be filled accordingly. After the entire surface has first been filled by utilization of the 4 corner points (21, 38, 398, 381), the resolution can be refined with each additional pixel group. The addition of the pixel group 87 leads to 4 triangles with the reference points (21, 38, 87), (21, 87, 381), (381, 87, 398), (398, 78, 38). Now if an additional pixel group (247) is inserted within such a triangle, e.g., 87, 381, 398, 3 new triangles (247, 381, 398), (247, 87, 381), and (247, 87, 398) arise. Each new pixel group thus generates 3 new triangles which can be filled. The more pixel groups are inserted, i.e., the more triangles are formed, the nearer the calculated color gradient comes to the actual color gradient of the image. Since as of now it is always the case that only new triangles arise, methods optimized for the calculations are used. Furthermore, the 3 triangles newly arising each time can be calculated in parallel in order to increase the processing speed. An additional possibility for parallelizing arises thereby if new pixel groups are added in different regions of the image.

I claim:

1. A method for compression of image data comprising an array of pixels, wherein each pixel has a pixel value that describes its color, the method comprising:
   a) arranging every pixel in the array into fixed pixel groups, wherein every pixel in a pixel group neighbors at least one other pixel in the pixel group,
   b) using one pixel of a pixel group as a reference pixel,
   c) determining a pixel difference value of the reference pixel by comparing its pixel value to the pixel value of every other pixel in said reference pixel's pixel group,
   d) repeating steps b) and c) until the pixel difference value of every pixel in the array has been calculated,
   e) determining a priority value for each pixel group based on the pixel difference values of every pixel in said each pixel group,
   f) ranking the pixel groups in decreasing order of priority value,
   g) storing the pixel groups on a computer readable medium in order of priority;
   wherein steps a), b), c), d), e), f), and g) are all performed by processor.

2. The method of claim 1, further comprising transmitting the pixel groups in order of their priority using the processor.

3. The method of claim 1, wherein the pixel difference value of the reference pixel is the average of the difference between the pixel value of the reference pixel and the pixel value of every other pixel in the reference pixel's pixel group.

4. The method of claim 1, further comprising storing a position value of every pixel on a computer readable medium.

5. The method of claim 4, wherein the position value of each pixel group is the position value of said each pixel group's reference pixel.

6. The method of claim 1, further comprising increasing the priority value of a pixel group based on the pixel group's position.

7. The method of claim 1, wherein the pixel values are further compressed by run length encoding or other compression methods.

8. The method of claim 1, wherein the pixel groups are sorted according to priority values by an image acquisition system.

9. A method for decompression of image data, the method comprising:
   a) generating an empty image array from a compressed image,
   b) inserting pixels groups from the corners of the compressed image at the corners of the image array,
   c) forming triangles from each of three immediately neighboring pixel groups,
   d) estimating unknown pixel values of the pixels inside the triangle by calculating a color gradient between the pixel groups forming the triangle,
   e) reading in and inserting the highest priority remaining pixel group into the image array, and
   f) repeating steps c) to e);
   wherein steps a), b), c), d), e), and f) are all performed by a processor.

10. The method of claim 9, wherein steps c) to e) are repeated until a desired amount of image data have been read in and processed.

11. The method of claim 9, wherein the triangles are scaleable in their size and adaptable to different image resolutions.

* * * * *